United States Patent [19]

Schoubye

[11] Patent Number: 5,108,731
[45] Date of Patent: Apr. 28, 1992

[54] SULFURIC ACID PROCESS AND APPARATUS

[75] Inventor: Peter Schoubye, Horsholm, Denmark

[73] Assignee: Haldor Topsoe A/S, Denmark

[21] Appl. No.: 613,584

[22] PCT Filed: May 18, 1989

[86] PCT No.: PCT/DK89/00129
§ 371 Date: Nov. 30, 1990
§ 102(e) Date: Nov. 30, 1990

[87] PCT Pub. No.: WO89/12024
PCT Pub. Date: Dec. 14, 1989

[51] Int. Cl.$^5$ .................. C01B 17/69; C01B 17/74
[52] U.S. Cl. .................. 423/522; 423/528; 423/529
[58] Field of Search .................. 423/522, 528, 529; 55/73

[56] References Cited

U.S. PATENT DOCUMENTS 2,901,061 8/1959 Hartig et al. .................. 55/73
4,348,373 9/1982 Schoubye .................. 423/522

FOREIGN PATENT DOCUMENTS

2072642 10/1981 United Kingdom .
2117368 10/1983 United Kingdom .

Primary Examiner—Gregory A. Heller
Attorney, Agent, or Firm—Ostrolenk, Faber, Gerb & Soffen

[57] ABSTRACT

Flue gases etc. may contain $SO_2$ which should be prevented from admission to the atmosphere. $SO_2$ is oxidized to $SO_3$ and condensed with steam to $H_2SO_4$-vapors which are condensed in vertical glass tubes cooled from the outside. In principle the condensate is collected near the bottom of the tubes. In the cooling process a mist of very small $H_2SO_4$ droplets is formed and tends to escape to the atmosphere. Environmental regulations continually increase the demands on reducing the amount of acid mist escaping. According to the invention an important method to achieve a reduction of the escape of acid mist is to pass the gas leaving each tube through an aerosol filter in gastight connection with the tube top. Such a filter may consist of acid resistant fibres or filaments having a thickness of 0.04–0.7 mm and may be arranged in specified manners to ensure a drop of pressure through below 20 mbar. Moreover, the sulfuric acid caught in the filter is caused to flow downwardly through the tube countercurrently with the feed gas. Various embodiments of filters and filter media for the purpose are disclosed. The sulfuric acid recovered is highly pure and highly concentrated.

5 Claims, 4 Drawing Sheets

SULFURIC ACID PROCESS AND APPARATUS

FIELD OF THE INVENTION

The present invention relates to a process in producing sulfuric acid in substantially vertical tubes of an acid resistant material, usually glass, while condensing vapours of sulfuric acid. Its purpose is to ensure that droplets of sulfuric acid (acid mist) are caught in a special filter The condensed sulfuric acid flows downwards through the tubes and is collected near their bottom end. The invention also relates to an apparatus for use in the process.

The process is especially suitable for the removal of sulfur dioxide from roasting processes and flue gases from boilers and power plants so as to recover the contents in the gas of sulfur oxides in the form of concentrated sulfuric acid, but it is also suitable for producing sulfuric acid from gases containing up to 10% sulfur oxides.

Plants in principle belonging to the present general type for desulfurizing and simultaneously removing $NO_x$ from flue gases has been described i.a. by P. Schoubye in Dansk Kemi [Danish Chemistry] 11, 1985, 327–330, and P. Schoubye et al in "Processing and utilization of High Sulfur Coals II", Chugh et al (ed.), Elsevier 1987, and in U.S. patent application No. 924,621.

Typically the tubes have an inner diameter of 25–60 mm and an effective cooling length of 120–150 times the inner tube diameter. The number of such tubes depend on the size of the plant in question. In a power plant having an effect of 300 MW the number is of the order of magnitude 60,000.

BACKGROUND OF THE INVENTION

It has been known for a long time that by cooling and condensing sulfuric acid vapours in air and in air containing aqueous vapour (steam) a sulfuric acid mist is formed, i.e. an aerosol of minute droplets of sulfuric acid. In U.S. patent specification No. 2,017,676 it has been proposed to counteract the formation of the acid mist by cooling a gas containing $SO_3, H_2SO_4$ vapour and $H_2O$ in vertical, narrow ceramic tubes surrounded by a layer of sand the purpose of which is to delay the cooling of the gas, and by an outer metal tube; coolant, preferably water, is in contact with the outer surface of the metal tubes. In this manner there can only be obtained sulfuric acid of low concentration and the gas discharged from the top of the tubes contains more acid mist than allowed under present environmental demands.

In DK patent specification No. 145,457 (corresponding to U.S. Pat. No. 4,348,373) there is disclosed a process for preparing concentrated sulfuric acid from gases containing $SO_3$ and excess of $H_2O$. The gas is cooled and the sulfuric acid condensed and concentrated in two steps in an absorption tower containing filler bodies. In the lowermost step the feed gas is passed upwardly countercurrently with the condensed acid, the concentration of which is thereby increased. In the subsequent step the sulfuric acid vapour is absorbed in sulfuric acid recycled through the layer containing filler bodies. The content of sulfuric acid mist is kept down by virtue of a specified regulation of the temperature at which the recycle acid is removed from the tower. According to this patent specification remaining acid mist is removed in an aerosol filter placed after the absorption zone. The filter is a "low velocity" filter operating at a linear velocity below 1 m/s and with a pressure drop above 20–30 mbar.

In DK patent application No. 1361/82 (corresponding to GB patent specification No. 2,117,368) a process is disclosed for preparing sulfuric acid in a sulfuric acid tower described in the specification. The tower is constructed as a tubular heat exchanger having two horizontal tube sheets and a bundle of vertical, acid resistant tubes extending into an inlet compartment below the lower tube sheet.

BRIEF DESCRIPTION OF THE DRAWINGS

This known process is most easily, like the present invention, described with reference to the drawings FIG. 1 of which represents the present state of the art in this technical field.

In the drawings

DISCUSSION OF PRIOR ART

Figure 1:
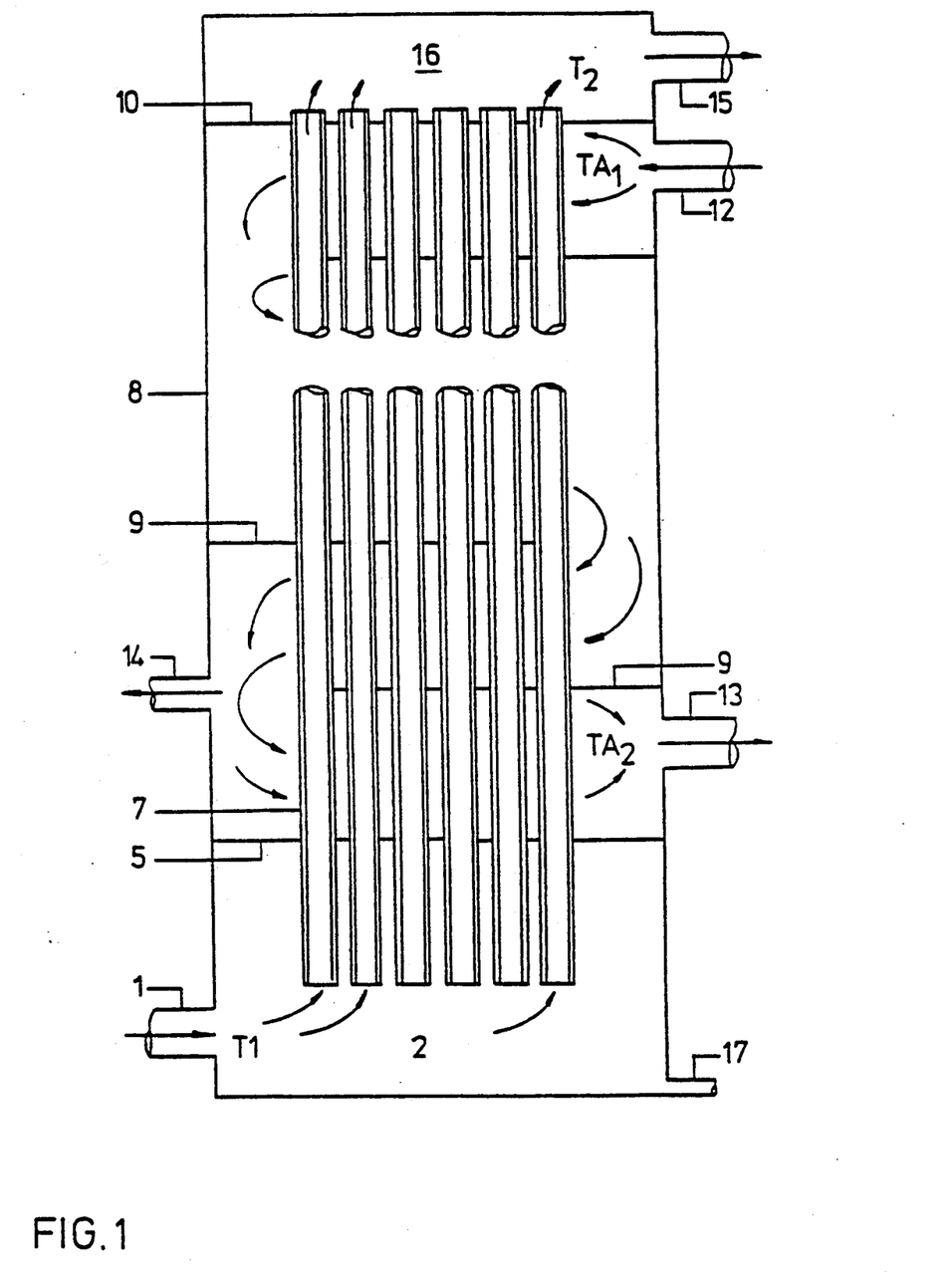
FIG. 1 schematically shows an apparatus for carrying out the process disclosed and claimed in GB patent specification No. 2,117,368.

In the process known from GB patent specification No. 2,117,368 (see FIG. 1) a hot gas stream having a temperature of 240°–330° C. and containing up to 10% vv $SO_3$ and 50% $H_2O$ (% by volume),and wherein the ratio (vol % $H_2O$)/vol % $SO_3$)>1, is passed from a compartment 2 in an upward direction through acid resistant tubes 7 externally cooled with air in a manner so as to cause the sulfuric acid to condense as a film of liquid flowing downwards on the inner wall of the tubes. The cooling air is passed through the apparatus in principle countercurrently with the sulfuric acid-containing gas in the tubes, i.e. by passing the cooling air, introduced at 12, sectionwise in a downward direction from the top countercurrently past the tubes through a number of sections separated by horizontal guide plates 9. In order to avoid the formation of large amounts of acid mist in the gas leaving the tubes it is prescribed that the temperature ($TA_2$) of the cooling air leaving the tower must satisfy the provision $$TA_2 > 125 + 6\alpha + \beta + 0,2 (T_1 - T_d) \,°C. \tag{4}$$

where $\alpha$ is the concentration, in % by volume, of $SO_3 + H_2SO_4$ vapour in the gas feed to the tower, $\beta$ is the concentration, in % by volume, of aqueous vapour in the same feed gas, $T_1$ is the temperature of the same feed gas expressed in °C; $T_d$ is the dew point of the sulfuric acid vapour in the same feed gas, expressed in °C.

In FIG. 1 reference numeral 1 represents an inlet pipe with acid resistant lining. The part of the tubes 7 between lower and upper tube sheets 5 and 10 is the condensing zone and the inner diameter of the tubes is typically 25–50 mm; they are made of a material having a thermal conductivity of at least 0.5 kcal/(m.h.°C.), in practice of glass having a conductivity of about 1.1 kcal/(m.h.°C.). Cooling air enters via an inlet 12, discharge gas from the tubes leaves the apparatus via a collective compartment 16 through a pipe 15. The cooling air is guided by guide plates 9 alternately in a crossward and a downward direction of flow to discharge openings 13,14 which can be opened and closed according to need. $T_2$ is the exit temperature of the gas from the tubes.

The process known from GB patent specification No. 2,117,368 (DK application No. 1361/82) involves several advantages, discussed therein, in comparison with the process of U.S. Pat. No. 4,348,373; the most important is that the heat evolved by the cooling of the gas and the condensation of the sulfuric acid is utilized for preheating air or gas, whereas this considerable amount of heat was lost in cooling water in the process according to U.S. Pat. No. 4,348,373. However, there are also some shortcomings.

Firstly, when utilizing said process one cannot achieve concentrations of acid mist (droplets of sulfuric acid) below about 25 ppm of $H_2SO_4$ (109 mg $H_2SO_4/Nm^3$) with tubes having an inner diameter (in the following abbreviated to i.d.) of about 30 mm or more, whereas for reasons of construction and economy it is preferred to use tubes having an inner diameter of 35-40 mm and an outer diameter (in the following abbreviated to o.d.) of 40-45 mm, notably in large plants. It has moreover been found by repetition of the measurings reported in the Table of said specification that the content of acid mist after the glass tubes sometimes may be more than double as high as that shown in the Table under otherwise the same experimental conditions.

Secondly, the content of droplets of sulfuric acid in the discharge gas increases if the linear gas velocity in the tubes is increased from 5 m/sec. as stated in the specification to, e.g., 8 m/sec. at the same time as the length of the tubes is increased to 6 meters for tubes having 36 mm i.d. in order to obtain a heat exchange surface needed to achieve the required values of $T_2$ and $TA_2$. Such an increase of the charge on each tube of 36 mm i.d. from about 9 $Nm^3/h$ feed gas to., e.g., 17 $Nm^3/h$ is very desirable because the price of a tower as shown in FIG. 1 largely depends only on the number of tubes in the tower and hence the total cross sectional area of the tower, whereas the extra expenditure involved in elongating the tubes and increasing the gas charge of each tube is very small.

Thirdly, it has been found that the content of acid mist in the discharge gas from the tubes is increased when the content of sulfuric acid vapour in the feed gas is descreased to below 1% by volume of $H_2SO_4$. At 0.1% by vol of $H_2SO_4$ and below, the major part of the content of sulfuric acid in the gas is accordingly discharged with the exit gas in the form of droplets, even if the temperature provisions according to formula (4) are observed. Since the process according to GB patent specification No. 2,117,368 is highly important especially for desulfurizing flue gases (see U.S. patent application No. 924,621) it is important to improve it in a manner such that the discharge gas contains droplets of sulfuric acid in amounts below about 40 mg of $H_2SO_4/Nm^3$ (corresponding to about 9 ppm $H_2SO_4$) which for environmental reasons is usually fixed as maximum.

The process for removal of the acid mist (the droplets of sulfuric acid) after the tubes known in principle from DK patent specification No. 145,457 (U.S. Pat. No. 4,348,373) consists in filtering the discharge gas in an aerosolfilter which is common to all of the glass tubes in the tower shown in FIG. 1. The residual content of acid mist after the condensation of the sulfuric acid vapours in a packed tower is removed in a "low velocity" aerosol filter. Such aerosol filters are typically utilized in ordinary sulfuric acid factories and are needed to remove droplets having a smaller size than 1 μm. A low velocity filter typically consists of threads of fibres or filaments having a diameter below 0.05 mm, is operated at a linear gas velocity below 1 m/s and causes pressure drops above 20-30 mbar. The use of such an aerosol filter for purifying the gas from the tubes would involve inconveniences because of the size of the filter and also because of the extra drop of pressure brought about. Moreover, the acid separated in the filter, having a strength of about 75% $H_2SO_4$, could not in practice be recycled to and distributed in the tubes. This would cause two further serious disadvantages, viz. firstly that the acid separated in the filter (which when treating lean gases (flue gases) might constitute the major part of the acid production) would have to be concentrated up to 93-96% $H_2SO_4$ by the aid of a separate plant; and secondly that it would be difficult to keep the tubes clean from dirt which is otherwise flushed out with the sulfuric acid flowing back through the tubes.

BRIEF DESCRIPTION OF THE INVENTION

It is the object of the invention to provide a process to remedy the abovementioned inconveniences involved in the processes known from DK patent specification No. 145,457 and GB patent specification No. 2,117,368.

Figure 5:
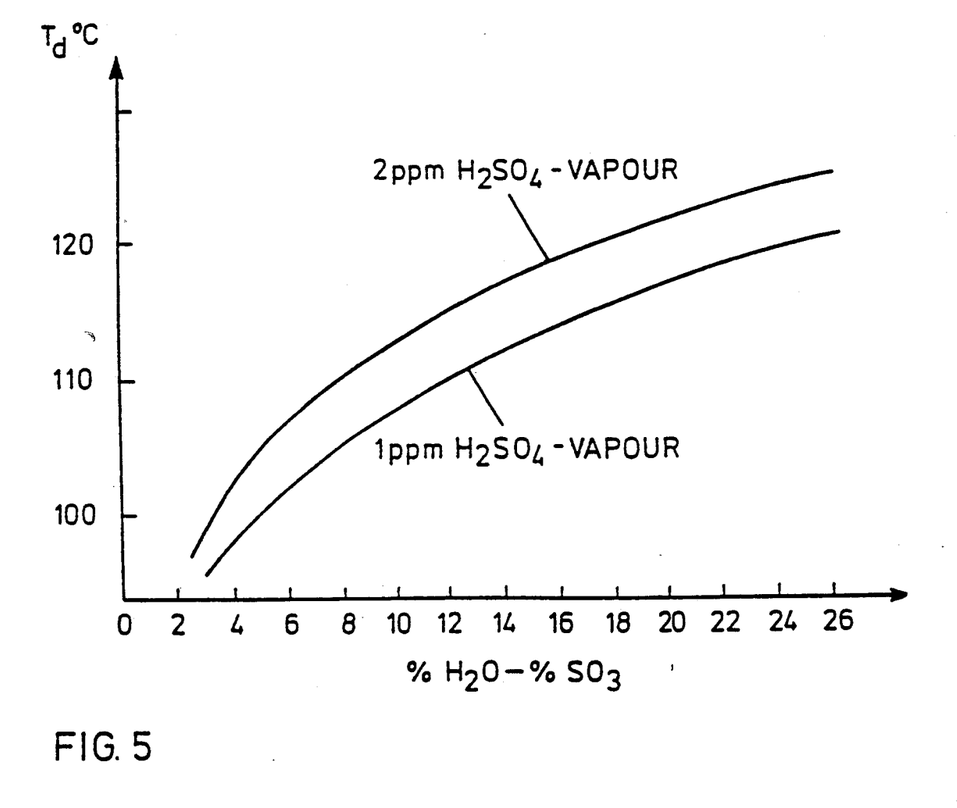

It has been surprisingly found that acid mist, i.e. droplets of acid in the gas at the outlet of the tubes, may be removed down to a content of $H_2SO_4$ below 40 mg per $Nm^3$ in a comparatively small "high velocity" aerosol filter of filaments or fibres having a diameter of 0.05-0.5 mm placed on each tube, at gas velocities of 2-6 m/sec (calculated at the actual pressure and without correction for the volume absorbed by the filter) at a drop of pressure through the filter between 2 and 20 millibars (mbar), frequently between 4 and 10 mbar, on the condition that the following temperature equations are satisfied:

$$TA_2 > TA_2^* = T_d 30 - 10\alpha °C. \quad (1)$$

$$T_2 < T_2^* \quad (2)$$

$$T_2 - TA_1 < 90° C. \text{ (preferably } < 85° C.)$$

wherein $T_d$, $T_2$ and $\alpha$ have the meanings defined hereinbefore, $TA_1$ and $TA_2$ are the inlet temperature and outlet temperature, respectively, of the cooling air, $TA_2^*$ is a calculated temperature determined by equation (1) and $T_2^*$ is the temperature at which the $H_2SO_4$ vapour pressure corresponds to 2 ppm $H_2SO_4$ vapour in the gas leaving the tubes. All temperatures are expressed in °C. and $T_2^*$ is normally between 100° and 125° C., depending on the partial pressure of $H_2O$ in the gas as shown in FIG. 5. The separated sulfuric acid flows back into the tube and leaves it near the bottom in the form of concentrated sulfuric acid.

If these conditions with respect to the inlet and outlet temperatures are not satisfied, the acid mist cannot be removed by said simple high velocity aerosol filters.

Accordingly, the invention relates to a process for condensing sulfuric acid vapours and catching droplets of sulfuric acid in substantially vertical, acid resistant tubes from gases containing 0.01–10% by vol. of $H_2SO_4$- vapour and 0–50% by vol. of $H_2O$-vapour, the sulfuric acid-containing gas being conducted to the tubes from below at a temperature of 0°–100° C. above the dew point of sulfuric acid in that gas, and being cooled during the flow through the tubes in an upward direction to an exit temperature $T_2$ which is lower than the temperature at which the $H_2SO_4$ vapour pressure is about $2 \times 10^{-6}$ bar in equilibrium with the partial pressure of aqueous vapour (steam) prevailing at the outlet of the tubes at the top, the tubes being cooled from the outside by a gaseous medium flowing substantially countercurrently with the sulfuric acid-containing gas and condensing sulfuric acid flowing downwards through the tubes during the cooling.

The process according to the invention is characterized in: (i) heating the gaseous medium during the cooling from an inlet temperature $TA_1$ of 0°–50° C. to an outlet temperature $TA_2$°C. by satisfying the provisions of equations (1) and (3) [see page 8], where $T_d$ is the sulfuric acid dew point, expressed in °C., of the sulfuric acid-containing gas passed to the tubes, and α is % by volume of $H_2SO_4$, calculated under the assumption that $SO_3$ has been completely hydrated, and (ii) passing the gas leaving each tube through a high velocity aerosol filter at a gas velocity of 1–7 m/sec., which filter is mounted in gastight connection on the top of each tube and comprises fibres or filaments with a diameter of 0.05 to 0.5 mm, the filaments or fibres being present in an amount, a layer thickness and a configuration such that the pressure drop through the filter is between 2 and 20 mbar.

The invention also relates to an apparatus for carrying out the process described. The apparatus comprises one or more bundles of substantially vertical tubes of an acid resistant material, each tube being provided with gas inlet at the bottom, a gas outlet at the top and an acid outlet near the bottom end, said tubes extending through a cooling zone having a length of 120 to 250 times the inner tube diameter and provided at the top and the bottom with inlet and outlet, respectively, for a gaseous cooling medium being passed countercurrently with the gas in the tubes; according to the invention each tube is provided with a high velocity aerosol filter mounted in gastight connection with the top of the tube.

Inside the tubes for the apparatus according to the invention there may, in order to improve the heat transmission value, be placed a strand of an acid resistant material having a thickness of 2–7 mm and wound to form a coil having an outer diameter of 90–100% of the inner diameter of the tube and a pitch of 20–200 mm per turn.

DETAILED DESCRIPTION OF THE INVENTION

Figure 2:
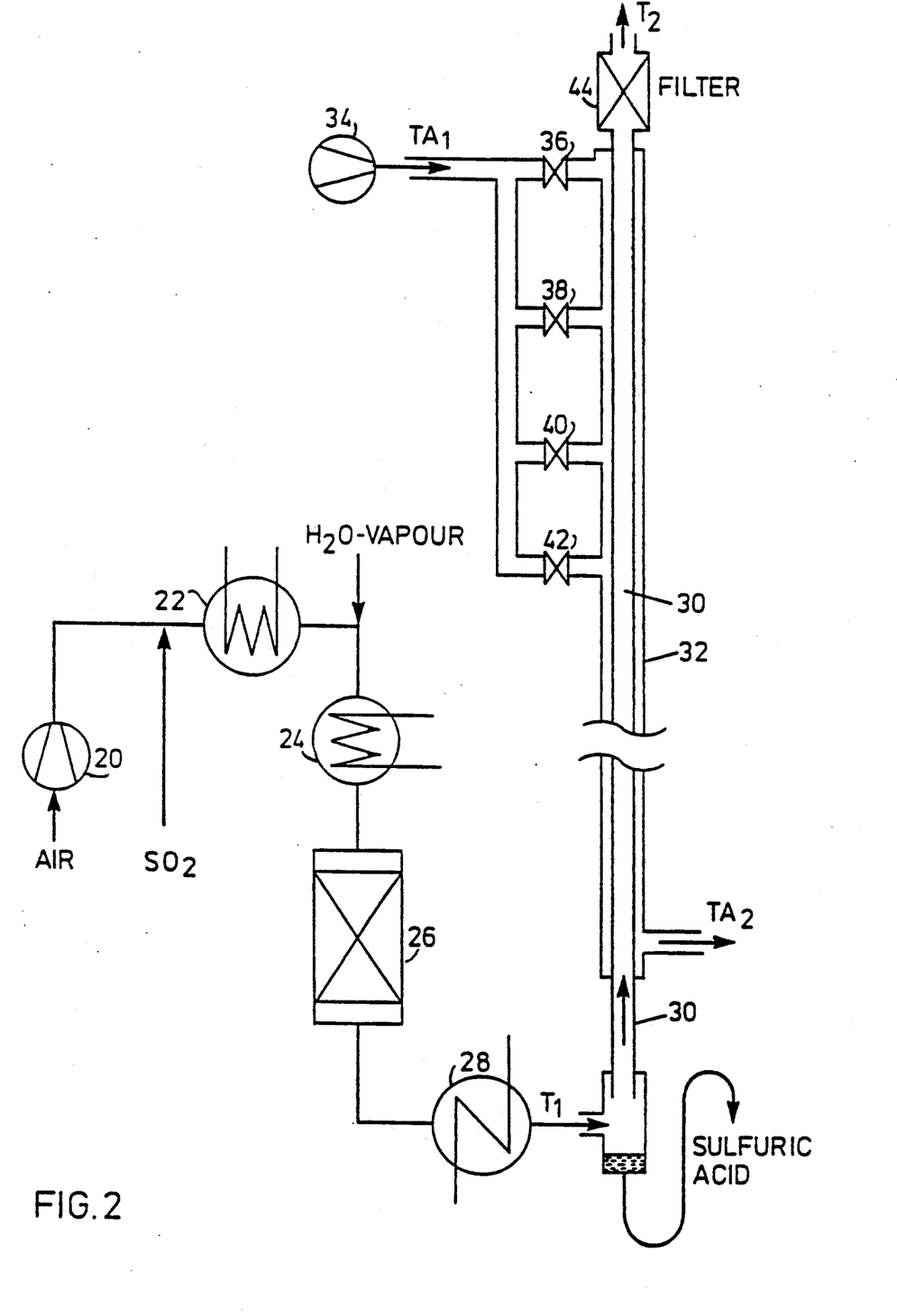
FIG. 2 shows schematically an experimental apparatus in which experiments on the process according to the present invention have been carried out.

A series of experiments to illustrate the invention have been conducted in the experimental plant shown in FIG. 2. It contains only one tube and has a capacity to treat up to 20 Nm³/h gas containing sulfuric acid, prepared by taking in air from the room by the aid of a blower 20, heating the air in an electric heater 22 and mixing it with steam and gaseous $SO_2$ to obtain a desired gas composition. The gas mixture is heated further to about 420° C. in an electric heater 24 after which it is passed through a catalytic reactor 26 in which about 96% of the content of $SO_2$ in the gas is oxidized to form $SO_3$ by the aid of a sulfuric acid catalyst of known type containing vanadium and potassium as active components. Subsequently the gas is cooled in a heat exchanger 28 to about 250° C. ($T_1$) before entering a sulfuric acid condenser consisting of a single glass tube 30 having a length of 6 m, an i.d. of 36 mm and an o.d. of 40 mm. In the upper 5.4 m of the length of the glass tube it is encased in a bigger tube 32 through which cooling air is passed from a blower 34, causing the gas stream in tube 30 to be cooled countercurrently with the air stream in the outer tube. The outer tube is insulated with 100 mm mineral wool. The cooling air can be introduced via one of a plurality of valves 36, 38, 40 and 42; hereby the cooled zone can be adjusted to 5.4, 4.95, 4.55 or 4.05 m, respectively The conditions of flow of the cooling air are adapted in a manner such that the heat transmission value (hv) at the outer side of the tube is the same as at a corresponding tube in an industrial plant in which the cooling air passes the bundle of tubes crosscurrently with typically six sections and countercurrently as shown in FIG. 1. The transmission value is typically 70 W/m²/°C. at the outer side of the tube and 30 W/m²/°C. at the inner side, whereas the resistance against the heat transmission in the glass wall is insignificant.

As mentioned the heat transmission value in the tube is improved when through its entire length it contains a coil formed by a strand having a thickness of 2–7 mm, an o.d. of the coil which is the same as or a little below the i.d. of the tube and a suitable pitch. This is due to the fact that the coil increases the turbulence of the gas flowing through the tube without increasing the amount of acid mist and without preventing the reflux of the acid downwards through the tube. Consequently the coil opens the possibility of increasing the throughput of gas in the tube without increasing the length of the latter. In the experiments there was used a coil having an o.d. of 35 mm and a pitch of 120 mm per turn.

In other experiments it has been found that the insertion of other means to give rise to turbulence in the tube, e.g. a chain, a screw or a spiral having a substantially lesser transverse dimension that the inner diameter of the tube results in an increased escape of acid mist through the filter 44 on the top of the tube 30; such means therefore are not suitable for improving the heat transmission value in the tubes.

Figure 3:
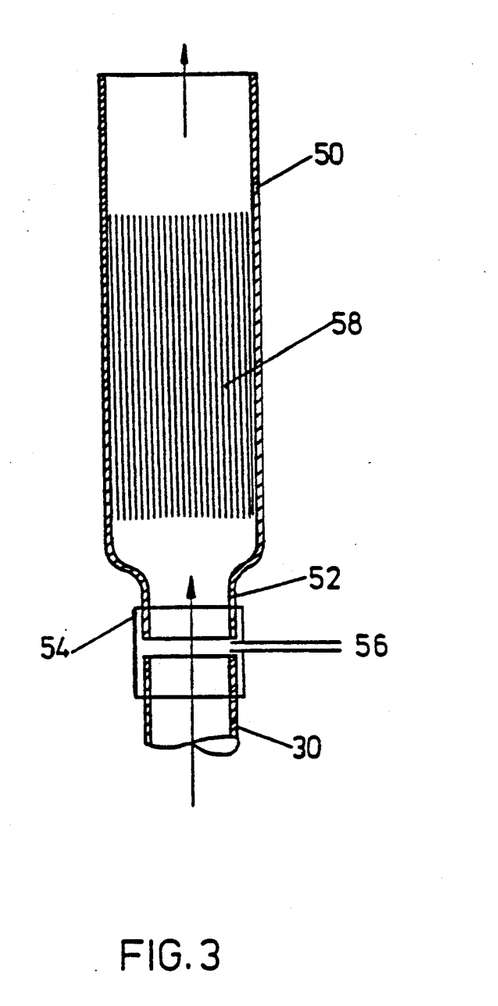
FIGS. 3 and 4 show two different embodiments of aerosol filters for use in the process according to the invention, and FIG. 5 are curves representing the sulfuric acid dew point for gases containing 1 and 2 ppm, respectively, of sulfuric acid vapour as a function of the content of aqueous apour in the gas.

The experiments are carried out with two different types of filter 44, characterized more fully in claims 2 to 4. The first mentioned filter is shown in FIG. 3 and in the following is called filter of type A whereas the other is shown in FIG. 4 and is called filter of type B.

The filter of type A consists of a cylindrical glass tube, hereinafter denoted filter cartridge 50, having an inner diameter of 46 mm and a length of 200 mm. The filter cartridge 50 in the bottom has a neck portion 52 the outer diameter of which is 40 mm; by the aid of an outer tightly fitting polytetrafluoroethylene sleeve 54 it is connected to the glass tube 30 having the same outer diameter. The drop of pressure through the filter cartridge is measured by the aid of a branched pipe 56 led through the sleeve. A filter medium 58 is placed in the filter cartridge; it consists of filaments of a fluorocarbon polymer having a thickness of 0.3 mm and knitted to form a web having a width of about 160 mm, the web being rolled to fit into the cartridge. This roll has the same diameter as the internal diameter of the filter cartridge. The filamentous material constitutes about 7% of the volume of the roll. When the droplets of sulfuric acid present in the gas move upwards through the roll the droplets are caught and agglomerate to form large drops which flow downwards in countercurrent with the gas and pass further down in the glass tube.

Figure 4:
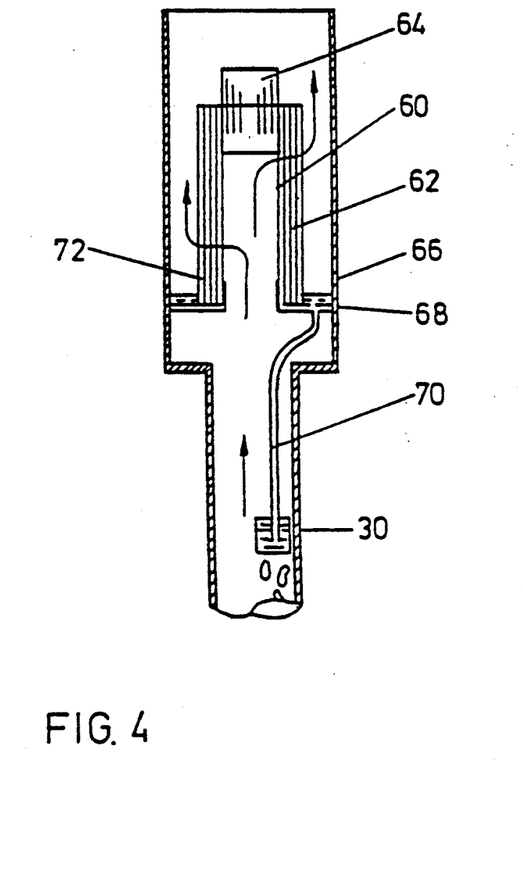

Filter type B is a radial filter as shown in FIG. 4, consisting of a perforated cylinder 60 of an acid resistant material, with an o.d. of about 24 mm and a length of the perforated zone of 40 mm. Ten layers of woven filter cloth 62 of fibres or filaments having a diameter of 0.1 mm are wrapped round the cylinder. The flow area in the filter can be decreased from a maximum area of about 30 cm² (calculated as for the outer surface of the cylinder) by the aid of a plug 64 fitting tightly into the interior of the cylinder and adjusted to a level blocking some of the perforations of the cylinder and uncovering the desired area of flow. In the following, denominations B1 and B2 apply to an area of flow of 26 and 23 cm², respectively, uncovered in the radial filter. The perforated cylinder is mounted in a housing 66 having an interior diameter of about 52 mm, in the lower part connected to the cylinder 60 by a tightly fitting bottom 68 through which a duct or pipe 70 extends in order to drain the acid filtered off and passed the glass pipe, the acid being forced to the exterior surface of the filter by the gas flow.

The drop of pressure $\Delta p$ through the filter can be calculated according to the well-known formulae shown hereinbelow, provided that the linear gas velocity v through the filter, the fiber or filament thickness d and the length 1 in the direction of flow of the filter layer (type A) or the number n of layers of filter cloth (type B) are known:

$$\text{type A: } \Delta p = 3 \times 10^{-3} \times v^{1.2} \times 1/d \text{ mbar} \quad (5)$$

$$\text{type B: } \Delta p = 3,5 \times 10^{-5} \times v^{1.2} \times n/d \text{ mbar} \quad (6)$$

In the following the process according to the invention is illustrated by some Examples.

EXAMPLE 1

Typical experimental results with the two filter types are summarized in Tables 1, 2 and 3; the feed gas to the tubes contained 0.1% $H_2SO_4$ + 7% $H_2O$ (or 25%), 1% $H_2SO_4$ + 8% $H_2O$, and 6% $H_2SO_4$ + 7% $H_2O$, respectively. The concentrations are the nominal composition at complete hydration of $SO_3$ to form $H_2SO_4$. The hydration reaction $$SO_3 + H_2O = H_2SO_4 \text{ (vapour)}$$

is always in equilibrium under the experimental conditions and is practically completely shifted at the right side at temperatures below 250° C.

Experimental results 1-1 to 1-6 in Table 1 (0.1% $H_2SO_4$ plus 7% $H_2O$ in the feed gas) show that the content of droplets of sulfuric acid in the gas phase before the filter is almost constant and corresponds to 60 to 80% of the content of $SO_3$ in the feed gas when $TA_2$ is lowered from 194° C. to 124° C. at constant values of $T_1$, $T_2$ and $TA_1$, and the length of the cooling zone is decreased from 5.4 m to 4.05 m and the stream of cooling air at the same time is increased so as to keep $T_2$ constant at 100° C. Filter A catches 98-99% of these droplets down to a value of $TA_2$ of about 160° C. while the content of $H_2SO_4$ in the discharge gas from filter A increases drastically, from 8-10 ppm at values of $TA_2$ as low as 170° C., to about 40 ppm at $TA_2 = 151°$ C., 200 ppm at 138° C., and 400 ppm at $TA_2 = 124°$ C.; at this value of $TA_2$ the filter seems practically inable to remove the acid droplets from the gas phase. Experiments 1-7 and 1-8 show that the value of $TA_2$ is the critical value that determines whether the acid mist can be separated in the filter. By these experiments $TA_2$ is lowered at below 155° C. by increasing in experiment 1-8, and by decreasing $T_1$ at 230° C. in experiment 1-7, respectively; this stream of cooling also causes the acid mist to penetrate through the filter. Experiment 1-10 shows that the increase of the gas stream through the tube to 18 Nm³/h causes the content of acid mist in the gas before the filter to increase to 90% of the amount of sulfuric acid, but that the filter still removes the droplets efficiently. It should be observed that attempts at increasing the gas stream further at 22 Nm³/h failed because in that case the acid could not flow back downwards through the glass tube in countercurrent with the gas. A decrease of the gas stream to 9 Nm³/h in experiments 1-11, 1-12 and 1-13 resulted in a decreased content of acid mist before the filter but a slightly higher content after the filter. Experiment 1-13 is a repetition of experiment 1-12 only with the exception that the length of the filter zone in A was doubled, which caused a doubling of the drop of pressure and more than a halving of the content of acid mist after the filter. In experiments 1-14 and 1-15 $T_2$ was augmented to 112° C. by increasing $TA_1$ to 50° C. in 1-14, and decreasing the stream of cooling air in 1-15. In both cases a clear increase of the acid mist content after the filter followed, which shows that a maximum outlet temperature of the gas is a further criterion to fulfil to ensure that the filter can remove the acid droplets efficiently. It is observed that the escape of $H_2SO_4$ in the form of vapour is only 3 ppm at 112° C., i.e. that more than 80% of the escape of acid here takes place in the form of acid droplets.

FIG. 5 shows the sulfuric acid dew temperature for gases containing 1 or 2 ppm of sulfuric acid vapour as a function of the content of $H_2O$ in the gas.

So far as the drops of pressure over the filter are concerned it is observed that filters A and B1 within the temperatures stated, remove the acid mist down to 8-10 ppm $H_2SO_4$ at drops of pressure of about 8 mbar, whereas filter B2—in which the linear gas velocity is 4 m/sec. in contradistinction to 2 m/sec. in B1—purifies it down to 1 ppm $H_2SO_4$ at a drop of pressure of 18 mbar and otherwise under the same conditions of operation. (When operating under the temperatures conditions shown, whereby only a small amount of liquid is stemmed in the filter, the drops of pressure are 10-20% above the drops of pressure measured when the filter operates under dry conditions with the same gas velocity and temperature, but without $H_2SO_4$ in the gas).

In experiments 1-17 and 1-18 the inlet temperature $TA_1$ of the air was lowered to 10° C. and 0° C. simultaneously with maintaining the outlet temperature $T_1$ at 100° C., whereby the temperature difference $T_2-TA_1$ was increased from 80° C. to 90° C. and 100° C.; the content of acid mist after the aerosol filters increased clearly and exceeded 10 ppm $H_2SO_4$ at $T_2-TA_1 = 100°$ C. In experiments 1-19 $T_2$ was lowered to 80° C. while maintaining $TA_2 = 0°$ C. (by increasing the stream of cooling air), whereby the acid mist after filters A and B1 fell to 10 ppm $H_2SO_4$; this shows that not the absolute value of $TA_1$ but the temperature difference according to condition (3) is important for the ability of the filter to remove the acid mist.

Table 2 shows results of experiments with a feed gas containing 1% $H_2SO_4$ plus 7% $H_2O$. In all the measurings on feed gas in an amount of 14 Nm³/h the content of acid mist in the gas before the filter was 500–1000 ppm $H_2SO_4$. The filters A, B1 and B2 removed the acid droplets in the same way as in the experiments reported in Table 1, only with the difference that the critical value of $TA_2$ seems to be around 170° C. corresponding to the fact that $TA_2^*$ according to formula (1) is calculated to be 172° C.

Table 3 shows results of experiments with a feed gas containing 6% $SO_3$ plus 13% $H_2O$. It is seen from experiments 3-1 to 3-6 that $TA_2$ must be above approximately 175° C. to enable the filters A and B1 to remove the content of acid mist, 500–1000 ppm, before the filter to below 10 ppm $H_2SO_4$. It also seems that the acid mist could be removed efficiently at a lower linear velocity and a lower drop of pressure than is the case for a feed gas containing 0.1% $H_2SO_5$.

An increase of aqueous vapour (steam) in the gas allows operation at a higher temperature $T_2$ at the outlet of the glass tube. This is seen from experiments 1-21 and 1-22 in Table 1. There an increase of the content of $H_2O$ in the feed gas to 25% involves the possibility of increasing the outlet temperature to 120°–125° C. without risking that the content of $H_2SO_4$ in the effluent gas exceeds about 10 ppm (in accordance with condition (2)) and the sulfuric acid dew point Td for a gas containing 2 ppm $H_2SO_4$ vapour as read in FIG. 5 as well as the $H_2O$ partial pressure in the effluent gas). It is correspondingly seen from experiments 3-11 and 3-12 in Table 3 that an increase of the content of $H_2O$ in the feed gas to 25%, whereby 19% $H_2O$ is present in the effluent gas, involves that $T_2$ may be increased to about 120° C. in accordance with condition (2). Like experiments 1-17 and 1-18 experiment 3-8 shows that the content of $H_2SO_4$ in the gas after the filters increases with increasing temperature difference $T_2-TA_1$ although the effect here in experiments with a strong gas seems to be weaker than with lean gases containing amounts of $H_2SO_4$ in the inlet gas of an order of magnitude of 0.1%.

EXAMPLE 2

Experiments with filament thicknesses of 0.05, 0.1, 0.2 and 0.5 mm in the filter type shown in FIG. 3, i.e. type A, in a coiled stocking knitware gave the following results: With a filament having a thickness of 0.05 mm the acid filtered off cannot flow back from the filter and down into the glass tube at gas velocities above about 1.5 m/sec. but is stemmed in the filter, which means that it cannot be used. With a filament having a thickness of 0.1 mm the same takes place at gas velocities of 2–3 m/sec., and at a filament thickness of 0.2 mm the acid cannot flow back at gas velocities above about 5 m/sec. At lower gas velocities the acid droplets are filtered off to a concentration below 5–10 ppm $H_2SO_4$ at drops of pressure below 10–20 mbar and a width of 160 mm of the coiled web of knitware filamentous material, provided that the temperature conditions defined by (1), (2) and (3) are fulfilled; with 0.5 mm filament there is no risk of stemming the liquid in the filter but it was necessary to insert two 120 mm wide coils in the filter cartridge in order to achieve an amount below 10 ppm acid in the effluent gas; moreover the content of acid mist after the filter seemed to be a few ppm higher at 0.1% $SO_3$ and the same conditions of operation and drops of pressure as the measurings in Table 1. From the experiments it is concluded that filament thicknesses of 0.2–0.4 mm are those most suitable for the purpose of the present invention.

EXAMPLE 3

Besides the experiments reported in Tables 1, 2 and 3, conducted with tissue wherein the fibres have a thickness 0.1 mm in the tissue employed in the radial flow filter B, experiments have been carried out with thread thickness of 0.05, 0.2 and 0.3 mm. The experiments showed that the drop of pressure over filters of wire cloth of 0.05 mm fibre thickness was unstable. Especially in connection with alterations of the conditions of operation the drop of pressure in periods could increase at a factor 2 to 3. Filter cloth made of threads above 0.2 mm needed, in order to obtain sufficient degree of removal of acid mist within the parameters defined in (1), (2) and (3), either linear gas velocities in the filter so high that the drop of pressure became significantly bigger than shown in Tables 1, 2 and 3; or that it was necessary to use more than ten layers of filter cloth in the radial filter, and for practical reasons there is not room for that with the stated (optimum) distance between the tubes in the bundle of tubes in the glass tube tower.

INDUSTRIAL USE OF THE INVENTION

It is expected that this invention will be industrially important especially in removing sulfur dioxide from roasting processes and from flue gases from power plants, notably middle sized and large power plants. Therefore the invention can be expected to highly diminish air pollution in industrial areas. A particular advantage is that the sulfur dioxide in the feed gases is recovered as highly concentrated sulfuric acid of high purity.

TABLE 1

| Exp. No. | Feed stream, Nm³/h | Cooled zone, m | $T_1$ °C. | $T_2$ °C. | $TA_1$ °C. | $TA_2$ °C. | ppm $H_2SO_4$ before filter | ppm $H_2SO_4$ after filter A | ppm $H_2SO_4$ after filter B1 | ppm $H_2SO_4$ after filter B2 | Gas velocity m/s through filter A | Gas velocity m/s through filter B1 | Gas velocity m/s through filter B2 | Δp mbar A | Δp mbar B1 | Δp mbar B2 |
|---|---|---|---|---|---|---|---|---|---|---|---|---|---|---|---|---|
| Experiments with feed gas containing 1000 ppm $H_2SO_4$ + 7% $H_2O$. $T_d$ = 185° C. $TA_2^*$ = 155° C. (see equation (1)) $T_2^*$ (dew point for 2 ppm $H_2SO_4$ and 7% $H_2O$) = 109° C. | | | | | | | | | | | | | | | | |
| 1-1 | 14 | 5.4 | 250 | 100 | 20 | 194 | 600 | 8 | 10 | 1 | 3.2 | 2.0 | 4.0 | 8 | 8 | 18 |
| 1-2 | 14 | 4.95 | 250 | 100 | 20 | 184 | 600 | 8 | 10 | 1 | 3.2 | 2.0 | 4.0 | 8 | 8 | 18 |
| 1-3 | 14 | 4.5 | 250 | 100 | 20 | 170 | 700 | 10 | 10 | 1 | 3.2 | 2.0 | 4.0 | 8 | 8 | 19 |
| 1-4 | 14 | 4.05 | 250 | 100 | 20 | 151 | 700 | 40 | 50 | 5 | 3.2 | 2.0 | 4.0 | 8 | 8 | 20 |
| 1-5 | 14 | 4.05 | 250 | 95 | 20 | 138 | 700 | 200 | 200 | 10 | 3.2 | 2.0 | 4.0 | 8 | 9 | 20 |
| 1-6 | 14 | 4.05 | 250 | 90 | 20 | 124 | 800 | 400 | 400 | 50 | 3.1 | 2.0 | 3.9 | 8 | 9 | 20 |
| 1-7 | 14 | 5.4 | 230 | 70 | 20 | 150 | 600 | 30 | 30 | 5 | 2.9 | 1.8 | 3.7 | 7 | 7 | 16 |
| 1-8 | 14 | 4.5 | 250 | 70 | 20 | 145 | 700 | 100 | 50 | 15 | 2.9 | | 3.7 | 7 | 7 | 18 |
| 1-10 | 18 | 5.4 | 250 | 100 | 20 | 173 | 900 | 6 | 8 | 1 | 4.1 | 2.6 | 5.2 | 12 | 12 | 26 |
| 1-11 | 9 | 4.5 | 250 | 100 | 20 | 198 | 150 | 10 | 15 | 2 | 2.05 | 1.3 | 2.6 | 4 | 5 | 10 |
| 1-12 | 9 | 4.05 | 250 | 100 | 20 | 193 | 200 | 12 | 15 | 2 | 2.05 | 1.3 | 2.6 | 4 | 5 | 10 |
| 1-13 | 9 | 4.05 | 250 | 100 | 20 | 193 | 200 | 5 | | | 2.05 | | | 8 | | |

TABLE 1-continued

| Exp. No. | Feed stream, Nm³/h | Cooled zone, m | $T_1$ °C. | $T_2$ °C. | $TA_1$ °C. | $TA_2$ °C. | ppm $H_2SO_4$ before filter | ppm $H_2SO_4$ after filter A | B1 | B2 | Gas velocity, m/s through filter A | B1 | B2 | $\Delta p$, mbar, through filter A | B1 | B2 |
|---|---|---|---|---|---|---|---|---|---|---|---|---|---|---|---|---|
| 1-14 | 14 | 5.4 | 250 | 112 | 50 | 188 | 600 | 20 | 20 | 5 | 3.3 | 2.1 | 4.2 | 9 | 9 | 19 |
| 1-15 | 14 | 5.4 | 250 | 112 | 20 | 205 | 700 | 15 | 20 | 10 | 3.3 | 2.0 | 4.2 | 9 | 8 | 19 |
| 1-16 | 14 | 5.4 | 280 | 100 | 20 | 200 | 700 | 8 | 10 | 2 | 3.2 | 2.0 | 4.0 | 8 | 8 | 18 |
| 1-17 | 14 | 5.4 | 250 | 100 | 10 | 201 | 700 | 10 | 10 | 3 | 3.2 | 2.0 | 4.0 | 8 | 8 | 18 |
| 1-18 | 14 | 5.4 | 250 | 100 | 0 | 205 | 800 | 20 | 20 | 5 | 3.2 | 2.0 | 4.0 | 8 | 8 | 19 |
| 1-19 | 14 | 5.4 | 250 | 80 | 0 | 177 | 700 | 10 | 10 | 1 | 3.0 | 1.9 | 3.8 | 7 | 7 | 18 |
| Experiments with 1000 ppm $H_2SO_4$ + 25% $H_2O$ in the feed gas. $T_d$ = 192° C. $T_2^*$ = 124° C. ||||||||||||||||
| 1-21 | 14 | 5.4 | 250 | 112 | 50 | 190 | 600 | 5 | 5 | 1 | 3.3 | 2.0 | 4.1 | 9 | 9 | 20 |
| 1-22 | 14 | 5.4 | 270 | 125 | 50 | 200 | 600 | 15 | 20 | 5 | 3.4 | 2.1 | 4.3 | 9 | 9 | 24 |
| 1-23 | 14 | 5.4 | 270 | 112 | 20 | 220 | | 10 | 10 | 2 | 3.3 | 2.0 | 4.1 | 9 | 9 | 20 |

TABLE 2

Experiments with feed gas with 1% $H_2SO_4$ + 7% $H_2O$. $T_d$ = 220° C. $TA_2^*$ = 172° C. (equation (1)). $T_2^*$ = 109° C.

| Exp. No. | Feed stream, Nm³/h | Cooled zone, m | $T_1$ | $T_2$ | $TA_1$ | $TA_2$ | ppm $H_2SO_4$ before filter | ppm $H_2SO_4$ after filter A | B1 | B2 | $\Delta p$, mbar, through filter A | B1 | B2 |
|---|---|---|---|---|---|---|---|---|---|---|---|---|---|
| 2-1 | 14 | 5.4 | 260 | 100 | 20 | 196 | ~500 | 5 | 5 | 1 | 8 | 8 | 20 |
| 2-2 | 14 | 4.95 | 260 | 100 | 20 | 184 | ~500 | 5 | 8 | 1 | 8 | 8 | 20 |
| 2-3 | 14 | 4.55 | 260 | 100 | 20 | 168 | ~800 | 25 | 40 | | 8 | 9 | 22 |
| 2-4 | 14 | 4.05 | 260 | 100 | 20 | 148 | ~2000 | 100 | 100 | 50 | 9 | 10 | 24 |
| 2-5 | 14 | 4.55 | 300 | 100 | 20 | 175 | 2000 | 10 | 10 | 2 | 8 | 8 | 20 |
| 2-6 | 9 | 4.05 | 260 | 100 | 20 | 180 | 1000 | 8 | 8 | 4 | 4 | 4 | 14 |
| 2-7 | 14 | 5.4 | 260 | 100 | 0 | 206 | ~800 | 12 | 14 | 4 | 8 | 8 | 20 |

TABLE 3

| Exp. No. | Feed stream, Nm³/h | Cooled zone, m | $T_1$ | $T_3$ | $TA_1$ | $TA_2$ | ppm $H_2SO_4$ before filter | ppm $H_2SO_4$ after filter A | B1 | B2 | Gas velocity, m/s A | B1 | B2 | $\Delta p$, mbar, through filter A | B1 | B2 |
|---|---|---|---|---|---|---|---|---|---|---|---|---|---|---|---|---|
| Experiments with feed gas with 6% $H_2SO_4$ + 7% $H_2O$. $T_d$ = 265° C. $TA_2^*$ = 175° C. $T_2^*$ = 109° C. |||||||||||||||||
| 3-1 | 11 | 5.4 | 300 | 100 | 20 | 230 | 500 | 5 | 5 | <1 | 2.2 | 1.4 | 2.8 | 4 | 4 | 9 |
| 3-2 | 11 | 4.55 | 300 | 100 | 20 | 198 | 700 | 5 | 10 | <1 | 2.2 | 1.4 | 2.8 | 5 | 4 | |
| 3-3 | 11 | 4.05 | 300 | 100 | 20 | 176 | 700 | 10 | 20 | 1 | 2.2 | 1.4 | 2.8 | 6 | 5 | 10 |
| 3-4 | 11 | 4.05 | 300 | 100 | 30 | 162 | 1000 | 50 | 80 | 10 | 2.2 | 1.4 | 2.8 | 10 | 6 | 15 |
| 3-5 | 11 | 4.05 | 300 | 100 | 40 | 153 | 1000 | 100 | 200 | | 2.2 | 1.4 | 2.8 | 15 | 7 | |
| 3-6 | 11 | 4.05 | 280 | 100 | 20 | 162 | 700 | 40 | 60 | | 2.2 | 1.4 | 2.8 | 10 | 6 | |
| 3-7 | 11 | 5.4 | 300 | 115 | 35 | 222 | 800 | 20 | 30 | | 2.3 | 1.4 | 3.0 | 5 | 5 | 12 |
| 3-8 | 11 | 5.4 | 300 | 100 | 0 | 240 | 500 | 8 | 8 | .4 | 2.2 | 1.4 | 2.8 | 4 | 4 | 9 |
| Experiments with 6% $H_2SO_4$ and 25% $H_2O$ in the feed gas. $T_d$ = 170° C. $T_2^*$ = 124° C. |||||||||||||||||
| 3-11 | 11 | 5.4 | 300 | 115 | 35 | 225 | 800 | 5 | | | 2.2 | | | 5 | | |
| 3-12 | 11 | 5.4 | 300 | 120 | 40 | 225 | 900 | 10 | | | 2.2 | | | 5 | | |

I claim:

1. A process for condensing vapours of sulfuric acid, catching droplets of sulfuric acid in substantially vertical, acid resistant tubes, from gases containing 0.01-10% by vol. of $H_2SO_4$-vapour and 0-50% by vol. of $H_2O$-vapour, and recovering the sulfuric acid, said process comprising (i) conducting said sulfuric acid-containing gas to the tubes from below at a temperature of 0°-100° C. above the dew point of sulfuric acid in said gas, and cooling said gas during the flow through the tubes in an upward direction to an exit temperature $T_2$ which is lower than the temperature at which the $H_2SO_4$ vapour pressure is about $2 \times 10^{-6}$ bar in equilibrium with the partial pressure of aqueous vapour at the outlet of the tubes from their top, the tubes being externally cooled by a gaseous medium flowing substantially countercurrently with the sulfuric acid-containing gas, the gaseous medium being thereby heated from an inlet temperature $TA_1$ of 0°-50° C. to an outlet temperature $TA_2$° C. and satisfying the provisions $$TA_2 > T_d - 30 - 10\alpha°C. \text{ and} \quad (1)$$

$$T_2 - TA_1 < 90° C. \quad (2)$$

where $T_d$ is the sulfuric acid dew point, expressed in °C., of the sulfuric acid-containing gas passed to the tubes and $\alpha$ is % by volume of $H_2SO_4$, calculated under the assumption that $SO_3$ has been completely hydrated, and condensed sulfuric acid flowing downward through the tubes during the cooling; and (ii) passing the gas leaving each tube through an aerosol filter consisting of acid resistant fibres or filaments having a diameter of 0.04 to 0.7 mm, the aerosol filter being mounted in gastight manner on the top of each tube and having a thickness and a configuration such that the pressure drop across the filter is between 2 and 20 mbar, the sulfuric acid caught in the aerosol filter flowing back downwardly through the tubes in counterflow with the feed gas; and (iii) withdrawing condensed sulfuric acid near the bottom of the tubes.

2. A process as claimed in claim 1, wherein said filter comprises a substantially vertical cylindrical housing in which a filter medium is placed, said medium consisting of a knitted material of acid resistant monofilaments having a thickness of 0.2 of 0.7 mm and a wide of stitch of 1 to 10 mm, said knitted material having been coiled or folded to form a cylindrical plug having a height of 20 to 300 mm and a cross sectional area corresponding to a linear gas flow velocity of 2 to 5 m/sec., said cross section at the same time being identical with the inner cross section of the housing.

3. A process as claimed in claim 1, wherein
i) said filter comprises a substantially cylindrical, vertical housing containing a filter medium consisting of a woven textile of acid resistant fibres or filaments having a diameter of 0.04 to 0.3 mm, said woven textile being wrapped round a perforated cylinder coaxial with the housing in a manner so as to allow the gas to flow radially through the wrapped textile and the perforations at a linear velocity of 2-6 m/sec., ii) the sulfuric acid condensed in the filter medium as well as that brought along with the gas through the filter medium and hence condensed already before the filter is caught in the bottom of the filter housing, and iii) the condensed sulfuric acid is passed from said housing bottom via a duct downwards into the tube in which the gas has been cooled.

4. A process as claimed in claim 3 wherein the diameter of the fibres or filaments is 0.05 to 0.2 mm.

5. A process as claimed in claim 1, wherein the velocity of the sulfuric acid-containing gas in the tubes is 2-6 m/sec., calculated on the basis of a theoretical gas temperature of 0° C.

* * * * *